US011680013B2

(12) United States Patent
Bittner et al.

(10) Patent No.: US 11,680,013 B2
(45) Date of Patent: Jun. 20, 2023

(54) CALCINER USING RECIRCULATED GASES

(71) Applicant: CARMEUSE LIME, INC., Pittsburgh, PA (US)

(72) Inventors: Jeffrey J. Bittner, Gibsonia, PA (US); Connor Maust, Pittsburgh, PA (US); Jozef Kohl, Seven Fields, PA (US)

(73) Assignee: CARMEUSE LIME, INC., Pittsburgh, PA (US)

( * ) Notice: Subject to any disclaimer, the term of this patent is extended or adjusted under 35 U.S.C. 154(b) by 390 days.

(21) Appl. No.: 15/930,858

(22) Filed: May 13, 2020

(65) Prior Publication Data
US 2020/0361819 A1    Nov. 19, 2020

Related U.S. Application Data

(60) Provisional application No. 62/954,816, filed on Dec. 30, 2019, provisional application No. 62/846,950, filed on May 13, 2019.

(51) Int. Cl.
*C01F 11/06* (2006.01)
*C04B 2/12* (2006.01)
(Continued)

(52) U.S. Cl.
CPC ............... *C04B 2/12* (2013.01); *B01D 53/62* (2013.01); *C01F 11/06* (2013.01); *F27B 7/2033* (2013.01);
(Continued)

(58) Field of Classification Search
None
See application file for complete search history.

(56) References Cited

U.S. PATENT DOCUMENTS 3,758,266 A    9/1973 Retali et al.
4,707,350 A    11/1987 Baudequin et al.
(Continued)

FOREIGN PATENT DOCUMENTS

CA    2669730    *    2/2008
CN    104718158    *    6/2015
(Continued)

OTHER PUBLICATIONS

Chou et al. "Sorbent Regeneration by Cascade Cyclone Calciner in a Pilot-Scale Calcium Looping Carbon Capture System," International Journal of Environmental Sele nee and Development, May 31, 2018 (May 31, 2018), vol. 9, No. 5, pp. 131-135.

*Primary Examiner* — Sheng H Davis
(74) *Attorney, Agent, or Firm* — Dentons Cohen & Grigsby P.C.

(57) ABSTRACT

A system for making oxide material may comprise a preheating cyclone stage for receiving a solid carbonate material and operating at a temperature less than a calcination temperature of the solid carbonate material, a calcination cyclone stage for heating the preheated solid carbonate material and operating at a temperature of at least the calcination temperature to convert the preheated solid carbonate material to a solid oxide material and carbon dioxide gas, a cooling cyclone stage for cooling the solid oxide material and operating at a temperature less than the calcination temperature to cool the solid oxide material to ambient temperature, a first recirculating system to extract and recirculate a first gas from an outlet of the calcination cyclone stage to an inlet of the calcination cyclone stage zone, and a second recirculating system to extract and recirculate a second gas from the cooling cyclone stage to the preheating cyclone stage.

20 Claims, 2 Drawing Sheets

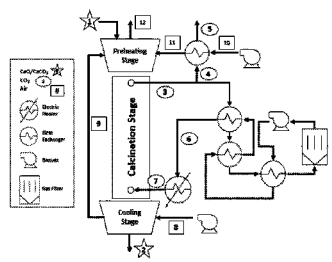

1 CaCO3 Feed Inlet to Preheating Stage
2 CaO Feed Outelt from Cooling Stage
3 CO2 Outlet from Calcination Stage
4 CO2 Slip Stream
5 CO2 Outlet Stream from Process
6 Heat Exchanger System CO2 Outlet/Electric Heater Inlet
7 CO2 Electric Heater Outlet to Calcination Stage Inlet
8 Cooling Air Inlet to Cooling Stage
9 Cooling Air Recycle to Preheating Stage
10 Cooling Air Inlet to CO2 Slip Stream Cooler
11 Preheated Air Outlet from CO2 Slip Stream Coling to Preheating Stage
12 Flue Gas to Stack

(51) Int. Cl.
  *B01D 53/62* (2006.01)
  *F27B 7/20* (2006.01)
(52) U.S. Cl.
  CPC .. *B01D 2251/304* (2013.01); *B01D 2251/306* (2013.01); *B01D 2251/404* (2013.01); *B01D 2251/602* (2013.01); *B01D 2251/606* (2013.01); *B01D 2257/504* (2013.01); *B01D 2258/0283* (2013.01)

(56) References Cited

U.S. PATENT DOCUMENTS

| | | | |
|---|---|---|---|
| 4,748,010 A | | 5/1988 | Walker |
| 5,919,038 A | * | 7/1999 | Labelle .................. F27B 15/00 432/106 |
| 8,871,165 B2 | | 10/2014 | Stallmann et al. |
| 9,321,683 B2 | | 4/2016 | Gimenez et al. |
| 9,610,536 B2 | | 4/2017 | Chen et al. |
| 9,630,879 B2 | | 4/2017 | Frie et al. |
| 2011/0113957 A1 | | 5/2011 | Sceats |
| 2013/0251599 A1 | | 9/2013 | Saito et al. |
| 2014/0072484 A1 | | 3/2014 | Gimenez et al. |
| 2014/0161696 A1 | | 6/2014 | Stallmann |
| 2019/0071351 A1 | | 3/2019 | Theulen |
| 2019/0359894 A1 | | 11/2019 | Heidel et al. |

FOREIGN PATENT DOCUMENTS

| | | | |
|---|---|---|---|
| DE | 102013020722 | * | 6/2015 |
| EP | 3029004 | * | 1/2014 |
| EP | 2910296 A1 | | 8/2015 |
| JP | 2009234905 | * | 10/2009 |
| JP | 2014014793 | * | 1/2014 |
| RU | 2525394 | * | 8/2014 |
| WO | 1990002104 A1 | | 3/1990 |
| WO | 9716389 | * | 5/1997 |
| WO | 2005108297 | * | 11/2005 |
| WO | 2008/059378 A2 | | 5/2008 |
| WO | 2016087390 | * | 6/2016 |
| WO | 2016/120253 A1 | | 8/2016 |

\* cited by examiner

FIG. 1

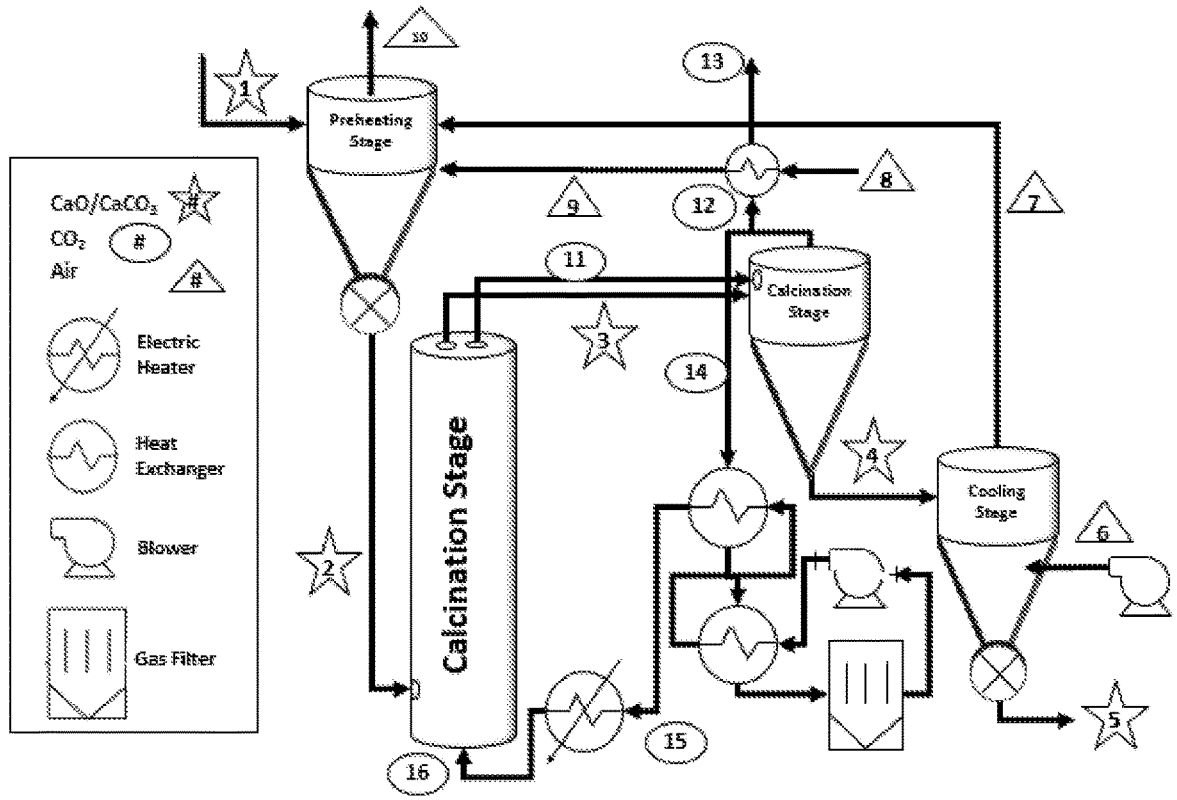

1 CaCO3 Preheating Stage Inlet
2 CaCO3 Preheating Stage Outlet/Calcining Stage Inlet
3 CaO Calcining Stage Outlet
4 CaO Calcining Stage Outlet/Cooling Stage Inlet
5 CaO Cooling Stage Outlet
6 Cooling Air Cooling Stage Inlet
7 Cooling Air Cooling Stage Outlet/Preheating Stage Inlet
8 Slip Stream Cooling Air
9 Slip Stream Preheated Air
10 CaCO3 Preheating Stage Outlet/Stack Inlet
11 CO2 Calcining Stage Outlet
12 CO2 Slip Stream (hot)
13 CO2 Slip Stream (cold)
14 CO2 Calcining Stage Outlet/Heat Recovery Inlet
15 CO2 Heat Recovery Outlet/Electric Heater Inlet
16 CO2 Electric Heater Outlet/Calcining Stage Inlet

FIG. 2

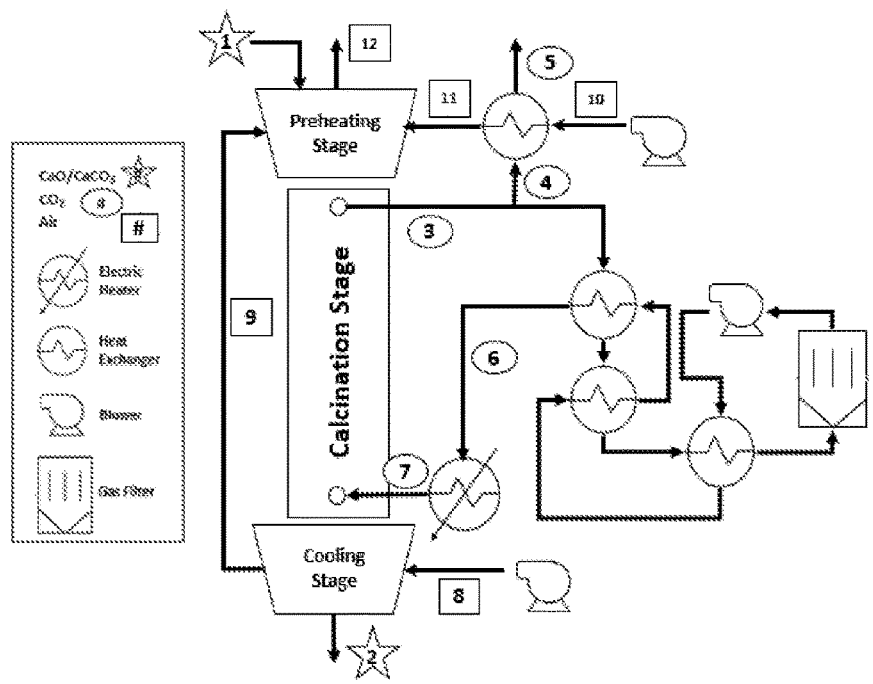

1 CaCO3 Feed Inlet to Preheating Stage
2 CaO Feed Outelt from Cooling Stage
3 CO2 Outlet from Calcination Stage
4 CO2 Slip Stream
5 CO2 Outlet Stream from Process
6 Heat Exchanger System CO2 Outlet/Electric Heater Inlet
7 CO2 Electric Heater Outlet to Calcination Stage Inlet
8 Cooling Air Inlet to Cooling Stage
9 Cooling Air Recycle to Preheating Stage
10 Cooling Air Inlet to CO2 Slip Stream Cooler
11 Preheated Air Outlet from CO2 Slip Stream Coling to Preheating Stage
12 Flue Gas to Stack

CALCINER USING RECIRCULATED GASES

CROSS REFERENCE TO RELATED APPLICATION

This application claims the benefit of U.S. Provisional Application No. 62/846,950 filed May 13, 2019, and U.S. Provisional Application No. 62/954,816, filed Dec. 30, 2019, the entire contents of each of which is incorporated herein by reference.

FIELD OF INVENTION

The present invention relates to systems and methods of making oxide materials using recirculated gases.

BACKGROUND

Calcium Oxide (CaO), commonly referred to as quicklime, may be used in the following industries: steelmaking, air pollution control, construction (mortar and cement), agri-food, waste and water treatment, glass, paper and pulp, and chemical. Quicklime may be produced by a process referred to as calcination. During calcination, solid calcium carbonate may be heated in a kiln to thermally decompose the solid calcium carbonate into solid calcium oxide and carbon dioxide gas. During calcination, carbon dioxide gas may be also produced from the combustion of fuels used to heat the kiln. The amount of heat and duration of heating during calcination may relate to one or more of the following factors: the form and/or particle size of the solid calcium carbonate, any impurities in the solid calcium carbonate, and the type of kiln used. Higher temperatures and/or longer heating times may lead to increased fuel and energy costs and a greater production of carbon dioxide gas. Accordingly, more efficient and/or cost effective systems and methods for making quicklime may be desirable.

SUMMARY

A system for making an oxide material may generally comprise a preheating cyclone stage for receiving a solid carbonate material and operating at a temperature less than a calcination temperature of the solid carbonate material (e.g., less than 900° C.), at least one calcination cyclone stage for heating the preheated solid carbonate material and operating at a temperature of at least the calcination temperature to convert the preheated solid carbonate material to a solid oxide material and carbon dioxide gas, a cooling cyclone stage for cooling the solid oxide material and operating at a temperature less than the calcination temperature to cool the solid oxide material to ambient temperature, a first recirculating system to extract and recirculate a first gas from an outlet of the at least one calcination cyclone stage to an inlet of the at least one calcination cyclone stage, and a second recirculating system to extract and recirculate a second gas from the cooling cyclone stage to the preheating cyclone stage.

A method of making an oxide material using an indirect-fired calciner may generally comprise preheating a solid carbonate material in a preheating cyclone stage operating at a temperature less than a calcination temperature of the solid carbonate material, heating the preheated solid carbonate material in a calcination cyclone stage operating at a temperature of at least the calcination temperature of the solid carbonate material to generate a solid oxide material and carbon dioxide gas, cooling the solid oxide material in a cooling cyclone stage operating at a temperature less than the calcination temperature of the solid carbonate material to cool the solid oxide material to ambient temperature, extracting a first gas from an outlet of the at least one of the calcination cyclone stage and a second gas from the cooling cyclone stage, and recirculating the first gas to an inlet of the at least one of the calcination cyclone stage and recirculating the second gas to the preheating cyclone stage.

A system for recovering heat and/or carbon dioxide from an indirect-fired calciner for making an oxide material may generally comprise a preheating cyclone stage for receiving a solid carbonate material and operating at a temperature less than a calcination temperature of the solid carbonate material, at least one calcination cyclone stage for heating the preheated solid calcium carbonate material and operating at a temperature of at least the calcination temperature of the solid carbonate material to convert the solid carbonate material to solid oxide material and carbon dioxide gas, a cooling cyclone stage for cooling the solid oxide material and operating at a temperature less than the calcination temperature to cool the solid oxide material to ambient temperature, the system comprising: a first recirculating system to extract and recirculate a first gas from an outlet of the at least one calcination cyclone stage to an inlet of the at least one calcination cyclone stage; and a second recirculating system to extract and recirculate a second gas from the cooling cyclone stage to the preheating cyclone stage.

DESCRIPTION OF THE DRAWINGS

The present invention described herein may be better understood by reference to the accompanying drawings; it being understood that this disclosure is not limited to the accompanying drawings.

FIG. 1 and FIG. 2 include systems for making an oxide material according to the present invention.

DETAILED DESCRIPTION

This disclosure generally describes oxide materials as well as methods of making and using the same. It is understood, however, that this disclosure also embraces numerous alternative features, aspects, and advantages that may be accomplished by combining any of the various features, aspects, and/or advantages described herein in any combination or sub-combination that one of ordinary skill in the art may find useful. Such combinations or sub-combinations are intended to be included within the scope of this disclosure. As such, the claims may be amended to recite any features, aspects, and advantages expressly or inherently described in, or otherwise expressly or inherently supported by, this disclosure. Further, any features, aspects, and advantages that may be present in the prior art may be affirmatively disclaimed. Accordingly, this disclosure may comprise, consist of, consist essentially or be characterized by one or more of the features, aspects, and advantages described herein. As used herein, the term "and/or" includes any and all combinations of one or more of the associated listed items.

All numerical quantities stated herein are approximate, unless stated otherwise. Accordingly, the term "about" may be inferred when not expressly stated. The numerical quantities disclosed herein are to be understood as not being strictly limited to the exact numerical values recited. Instead, unless stated otherwise, each numerical value stated herein is intended to mean both the recited value and a functionally equivalent range surrounding that value. At the very least, and not as an attempt to limit the application of the doctrine of equivalents to the scope of the claims, each numerical value should at least be construed in light of the number of reported significant digits and by applying ordinary rounding techniques. Notwithstanding the approximations of numerical quantities stated herein, the numerical quantities described in specific examples of actual measured values are reported as precisely as possible. Any numerical values, however, inherently contain certain errors necessarily resulting from the standard deviation found in their respective testing measurements.

All numerical ranges stated herein include all sub-ranges subsumed therein. For example, a range of "1 to 10" or "1-10" is intended to include all sub-ranges between and including the recited minimum value of 1 and the recited maximum value of 10 because the disclosed numerical ranges are continuous and include every value between the minimum and maximum values. Any maximum numerical limitation recited herein is intended to include all lower numerical limitations. Any minimum numerical limitation recited herein is intended to include all higher numerical limitations.

All compositional ranges stated herein are limited in total to and do not exceed 100 percent (e.g., volume percent or weight percent) in practice. When multiple components may be present in a composition, the sum of the maximum amounts of each component may exceed 100 percent, with the understanding that, and as those skilled in the art would readily understand, that the amounts of the components may be selected to achieve the maximum of 100 percent.

In the following description, certain details are set forth in order to provide a better understanding of various features, aspects, and advantages the invention. However, one skilled in the art will understand that these features, aspects, and advantages may be practiced without these details. In other instances, well-known structures, methods, and/or techniques associated with methods of practicing the various features, aspects, and advantages may not be shown or described in detail to avoid unnecessarily obscuring descriptions of other details of the invention.

The terminology used herein is for the purpose of describing particular examples only and is not intended to be limiting. As used herein, the singular forms "a", "an", and "the" may be intended to include the plural forms as well, unless the context clearly indicates otherwise. The terms "comprises", "comprising", "including", "having", and "characterized by", are inclusive and therefore specify the presence of stated features, elements, compositions, steps, integers, operations, and/or components, but do not preclude the presence or addition of one or more other features, integers, steps, operations, elements, components, and/or groups thereof. Although these open-ended terms are to be understood as a non-restrictive term used to describe and claim various aspects set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, described herein also specifically includes embodiments consisting of, or consisting essentially of, such recited compositions, materials, components, elements, features, integers, operations, and/or process steps. In the case of "consisting of", the alternative embodiment excludes any additional compositions, materials, components, elements, features, integers, operations, and/or process steps, while in the case of "consisting essentially of", any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on", "engaged to", "connected to", or "coupled to" another element or layer, it may be directly on, engaged, connected or coupled to the other component, element, or layer, or intervening elements or layers may be present. In contrast, when an element is referred to as being "directly on", "directly engaged to", "directly connected to", or "directly coupled to" another element or layer, there may be no intervening elements or layers present. Other words used to describe the relationship between elements should be interpreted in a like fashion (e.g., "between" versus "directly between", "adjacent" versus "directly adjacent", etc.).

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first", "second", and other numerical terms when used herein may not imply a sequence or order unless clearly indicated by the context. Thus, a first step, element, component, region, layer or section discussed below may be termed a second step, element, component, region, layer or section without departing from the teachings herein.

Spatially or temporally relative terms, such as "before", "after", "inner", "outer", "beneath", "below", "lower", "above", "upper", and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures. As used herein, "top" means furthest away from the substrate, while "bottom" means closest to the substrate. Where a first layer is described as "disposed over", "provided over", or "deposited over" a second layer, the first layer is disposed further away from substrate. There may be other layers between the first and second layer, unless it is specified that the first layer is "in contact with", "disposed on", "provided on", or "deposited on" the second layer.

The present invention may be generally directed to more efficient and/or cost-effective systems and methods for making oxide materials, such as quicklime.

The present invention may be generally directed to a system for making quicklime comprising a calciner comprising a preheating zone for receiving a solid carbonate material and operating at a temperature less than a calcination temperature of the solid carbonate material, a calcination zone for heating the preheated solid carbonate material and operating at at least the calcination temperature to convert the preheated solid carbonate material to a solid oxide material and carbon dioxide gas, a cooling zone for cooling the solid oxide material and operating at a temperature less than the calcination temperature to cool the solid oxide material to ambient temperature, a first recirculating system to extract and recirculate a first gas from the outlet of the calcination zone to the inlet of the calcination zone, and a second recirculating system to extract and recirculate a second gas from the cooling zone to the preheating zone.

The solid carbonate material may comprise calcium, dolomite, dolomitic stone, or other metallic carbonate material, including, but not limited to, magnesium carbonate ($MgCO_3$), calcium carbonate ($CaCO_3$), sodium carbonate ($Na_2CO_3$), potassium carbonate ($K_2CO_3$), ferrous carbonate ($FeCO_3$), manganese carbonate ($MnCO_3$), cobalt carbonate ($CoCO_3$), nickel carbonate ($NiCO_3$), cupric carbonate ($CuCO_3$), zinc carbonate ($ZnCO_3$), aluminum carbonate ($Al_2CO_3$). The solid carbonate material may comprise, based on weight percent of the solid carbonate material, up to 100% calcium carbonate ($CaCO_3$) and a balance of incidental impurities. The upper limit of the solid carbonate material, based on weight percent of the solid carbonate material, may be 50%, 60%, 75%, 80%, 90%, 92%, 95%, 97%, 98%, 99%, and 100%. The lower limit of the solid carbonate material, based on weight percent of the solid carbonate material, may be 50%, 60%, 75%, 80%, 90%, 92%, 95%, 97%, 98%, and 99%. The incidental impurities, may comprise, based on weight percent of the solid carbonate material, up to 5%, up to 4%, up to 3%, up to 2%, up to 1%, and less than 1%. The solid carbonate material may comprise a particle size up to 120 mm, such as, for example, from greater than zero up to 120 mm, 1-120 mm, 10-100 mm, 25-75 mm, 50-100 mm, 1-20 mm, 40-60 mm, 75-100 mm, and 0.01-10 mm. The upper limit of the particle size may be 120 mm, 100 mm, 80 mm, 75 mm, 60 mm, 50 mm, 40 mm, or 20 mm, The lower limit of the particle size may be 0.01 mm, 0.1 mm, 1 mm, 10 mm, 25 mm, 40 mm, 50 mm, 60 mm, or 75 mm. The solid carbonate material may be blended with water to comprise up to 50% by weight moisture content, such as, for example, 0-40%, greater than 0 up to 40%, 10-30%, 30-40%, and 40-50%. The upper limit of the moisture content may be 30%, 40%, or 50%. The lower limit of the moisture content may be greater than 0%, 1%, 2%, 3%, 5%, 10%, 20%, 25%, 30%, or 40%.

The calciner may comprise a rotary kiln, a fluidized bed reactor. The rotary kiln may comprise an indirect-fired, vertical kiln. The indirect-fired, vertical kiln may comprise an electric kiln. The calciner may heat the solid carbonate material in the preheating zone and/or calcination zone such that the solid carbonate material does not contact the hot flue gas stream, i.e., process gas(es). The calciner may generate a temperature up to 2000° C. (e.g., 900-2000° C., 900-1300° C., 1300-2000° C.) in one or more individually controlled temperature zones. The preheating zone may heat the solid carbonate material to a temperature from 0-900° C. (e.g., 500-900° C. or 700-900° C.). The calcination zone may heat the solid carbonate material to a temperature from 700-1050° C. (e.g., 700-950° C. or 900-1050° C.) in the calcination zone. For example, the solid carbonate material may undergo a thermal decomposition at temperatures from 500-1000° C. The cooling zone may cool the solid oxide material to a temperature from 20-300° C. (e.g., ambient temperature). The calciner may use one or more of solid, liquid, and gaseous hydrocarbon fuel or electricity or renewable energy to generate heat. For example, the calciner may use coal, natural gas, and/or recirculated (heated) gases.

The first gas and second gas may each comprise air, steam, carbon dioxide, nitrogen, oxygen, and incidental impurities, and combinations thereof. The first gas and second gas may each consist of carbon dioxide and incidental impurities. The first gas may have a temperature of 750-1100° C. (e.g., 750-900° C.) when extracted from the outlet of the calcination zone and a temperature of 900-2000° C. (e.g., 900-1300° C.) when inserted into the calcination zone. The second gas may have a temperature of 500-1000° C. (e.g., 500-950° C.) when extracted from the cooling zone and a temperature of 500-1000° C. (e.g., 500-950° C.) when inserted into the preheating zone.

The first gas may provide a first portion and the second gas may provide a second portion of the energy in the calcination zone. The first portion may be greater than or equal to the second portion. The first gas may provide at least a portion of 3.2-4.5 GJ/ton of solid carbonate material for heating the preheated solid carbonate material in the calcination zone, such as, 50-100%, at least 50%, at least 60%, at least 75%, at least 80%, at least 90%, and at least 95%, for example, of 3.2-4.5 GJ/ton of solid carbonate material for heating the preheated solid carbonate material in the calcination zone. The second gas may provide at least a portion of 0.7-1.2 GJ/ton of solid carbonate material for preheating the solid carbonate material in the preheating zone, such as 10-50%, up to 40%, up to 30%, up to 25%, and 25-50%, for example, of 0.4-1.2 GJ/ton of solid carbonate material for preheating the solid carbonate material in the preheating zone. The energy requirement of the calcination heater to heat the calcination zone relative to a temperature of the first gas to achieve the calcination temperature is reduced by at least 30-50% relative to a system lacking the first recirculating system and the second recirculating system, such as an upper limit of 95%, 90%, 80%, 75%, 60%, and 50%.

The first recirculating system may comprise an inlet and an outlet to fluidly connect the outlet of the calcination zone to the inlet of the calcination zone, and a second recirculating system may comprise an inlet and an outlet to fluidly connect the cooling zone and the preheating zone. The first recirculating system may comprise a first flow path wherein the outlet of the calcination zone is in fluid communication with the inlet of the calcination zone. The inlet of the first recirculating system may extract the first gas from the preheating zone and the outlet may insert the first gas into the inlet of the calcination zone. The second recirculating system may comprise a second flow path wherein the cooling zone is in fluid communication with the preheating zone. The inlet of the second recirculating system may extract the first gas from the cooling zone and the outlet may insert the first gas into the preheating zone.

Referring to FIG. 1, a system for making quicklime may generally comprise an indirect-fired, vertical kiln comprising a preheating zone (2) for receiving a solid calcium carbonate ($CaCO_3$) material and operating at a temperature less than a calcination temperature of the solid calcium carbonate ($CaCO_3$) material, a calcination zone (1) for heating the preheated solid calcium carbonate ($CaCO_3$) material and operating at at least the calcination temperature to convert the preheated solid calcium carbonate ($CaCO_3$) material to a solid calcium oxide (CaO) material and carbon dioxide ($CO_2$) gas, a cooling zone (3) for cooling the solid calcium oxide (CaO) material and operating at a temperature less than the calcination temperature to cool the solid calcium oxide (CaO) material to ambient temperature, a first recirculating system (8) to extract and recirculate a first gas from the outlet of the calcination zone (2) to the inlet of the calcination zone (1), and a second recirculating system (12)

to extract and recirculate a second gas from the cooling zone (3) to the preheating zone (2).

The calciner may comprise an inlet for receiving the solid carbonate material, at least one valve to retain the solid carbonate material in the preheating zone and/or calcination zone, and an outlet to discharge the solid oxide material from the cooling zone. The at least one valve may comprise a first valve to retain the solid carbonate material in the preheating zone and a second valve to retain the solid carbonate material in the cooling zone. The cooling zone (3) may rest upon a base.

The first valve may be in a closed position when the solid carbonate material has not achieved a desired time in the preheating zone and/or a desired temperature, e.g., the calcination temperature. The first valve may be in an open position when the solid carbonate material achieves the desired time in the preheating zone and/or a desired temperature, e.g., a preheating temperature or the calcination temperature. The second valve may be in a closed position when the solid carbonate material has not achieved a desired time in the calcination zone and/or a desired temperature, e.g., the calcination temperature, and/or converted to a desired amount of solid oxide material. The second valve may be in an open position when the solid carbonate material achieves the desired time in the calcination zone and/or a desired temperature, e.g., the calcination temperature, and/or a desired amount of solid oxide material, e.g., at least 50% by weight.

As shown in FIG. 1, the second recirculating system (12) may extract and recirculate at least a portion of the second gas from the cooling zone (3) to the preheating zone (2). The second flow path may comprise an outlet in the cooling zone in fluid communication with an inlet in the preheating zone and a hot air recycle airline (12). The first and second recirculating system may recirculate a hot flue gas stream to contact at least one of the solid carbonate material and preheated solid carbonate material, wherein the hot flue gas stream comprises, based on total volume of the hot flue gas stream, at least 90%, at least 92%, at least 95%, at least 97%, at least 99%, up to 100%, 90-100%, 95-100%, 95-98%, or 99-100% of the first gas and second gas. The first and second recirculating system may recirculate a hot flue gas stream to contact at least one of the solid carbonate material and preheated solid carbonate material, where the hot flue gas stream comprises a ratio of the first gas to the second gas of 1:1 to 50:1, such as, 1:1, 2:1, 5:1, 10:1, 20:1, 25:1, 30:1, 35:1, 40:1, 45: 1, and 50:1, for example.

As shown in FIG. 1, the first recirculating system may extract and recirculate at least a portion of the first gas from the outlet of the calcination zone stage (2) to the inlet of the calcination zone stage (1) and, optionally, may vent a portion of the first gas from the outlet of the calcination zone stage to the atmosphere or capture the portion of the first gas from the outlet of the calcination zone stage. After the first gas is extracted from the outlet of the calcination zone stage (2), the first gas may be filtered, cooled, compressed and/or heated prior to inserting the first gas into the inlet of the calcination zone stage (1). Referring to FIG. 1, the first flow path may comprise a gas treatment filter (4), a first heat exchanger (5), a blower (6), a second heat exchanger (7), a third heat exchanger (11), and an electric heater (13). At least a portion of the first gas may be extracted from the outlet of the calcination zone stage (2) into the gas treatment filter (4). The gas treatment filter (4) may comprise a series of ceramic fiber filters and/or metal filters to clean the flue gas.

Once filtered, a portion of the first gas may exit from the gas treatment filter (4) to the first heat exchanger (5) and a portion of the first gas may exit from gas treatment filter (4) to the third heat exchanger (11). The first heat exchanger (5) may comprise a carbon dioxide to air heat exchanger. The first heat exchanger (5) may have a first inlet to receive the first gas from the hot gas treatment filter (4) and a second inlet to receive atmospheric air. The portion of the first gas from the hot gas treatment filter (4) may heat the atmospheric air in the first heat exchanger (5). A portion of the first gas may exit from the first heat exchanger (5) to the recirculation blower (6) and a portion of the first gas may exit from the first heat exchanger (5) to the second heat exchanger (7) via the carbon dioxide loop line (10). The second heat exchanger (7) may comprise an air to carbon dioxide heat exchanger. A portion of the first gas may exit from the second heat exchanger (7) to the third heat exchanger (11) via the fan (9) and a portion of the first gas may exit from the second heat exchanger (7) to the electric heater (13). The third heat exchanger (11) may vent a portion of the first gas to the atmosphere and reinsert a portion of the first gas into the preheating zone (2). The first gas may exit from the electric heater (13) to return to the calcination zone (1).

Referring to FIG. 2, a system for making quicklime may generally comprise at least one of a vertical cyclone and an indirect fired calciner, each independently comprising a preheating cyclone stage (1) for receiving a fine, solid calcium carbonate ($CaCO_3$) material and operating at a temperature (e.g., up to 900° C.) less than a calcination temperature of the solid calcium carbonate ($CaCO_3$) material to preheat the solid calcium carbonate material and evaporate the water therein, if any, a calcination cyclone stage (2) for calcining the preheated, fine, solid calcium carbonate ($CaCO_3$) material by operating at the calcination temperature to convert the preheated, fine, solid calcium carbonate ($CaCO_3$) material to a solid calcium oxide (CaO) material and carbon dioxide ($CO_2$) gas, a cooling cyclone stage (3) for cooling the solid calcium oxide (CaO) material and operating at a temperature less than the calcination temperature to cool the solid calcium oxide (CaO) material to ambient temperature using air and to preheat the air to a temperature greater than ambient temperature. The system may comprise a first recirculating system to extract and recirculate a first gas (e.g., carbon dioxide ($CO_2$) gas) from an outlet of the calcination cyclone stage (2) to an inlet of the calcination cyclone stage (1). The system may comprise a second recirculating system to extract and recirculate a second gas (e.g., preheated air) from the cooling cyclone stage (3) to the preheating cyclone stage (2). The system may comprise a cooling and/or preheating system wherein the cooling cyclone stage (3) is in fluid communication with the preheating cyclone stage (1), but not the calcination cyclone stage (2). The fine, solid calcium carbonate may have a particle size from greater than zero up to 5 mm, such as 50 micrometers to 5 mm or from greater than 0 up to 10 mm.

The preheating cyclone stage and the calcination cyclone stage may comprise the same cyclone or different cyclones. For example, the fine, solid calcium carbonate ($CaCO_3$) material may be received, preheated, and calcined in the same cyclone. This cyclone may operate at a temperature from 900-2000° C. (e.g., 900-1300° C.), such as a temperature from 700-1100° C. (e.g., 700-950° C.) during the preheating step, and a temperature from greater than 900° C. up to 2000° C. (e.g., 900-1300° C.) during the calcining step. When the fine, solid calcium carbonate ($CaCO_3$) material is received, preheated, and calcined in the same cyclone, then the first recirculating system may extract and recirculate a first gas (e.g., carbon dioxide ($CO_2$) gas) from an outlet of this cyclone to an inlet of this cyclone. The calcination cyclone stage may comprise a plurality of calcination cyclone stages operating in series and/or parallel.

At least a portion of the carbon dioxide ($CO_2$) gas from the calcining cyclone may be extracted from the outlet of the calcining cyclone to be recirculated via the calcining loop, and any remaining portion of the carbon dioxide ($CO_2$) gas may be vented, captured, and/or used in other processes. The carbon dioxide ($CO_2$) gas in the calcining loop may be heated up to 2000° C. by an electrical heater. The electrical heater may produce heat via inductive, resistance, infrared, microwave, plasma, or any type based on electrical power.

The heated carbon dioxide ($CO_2$) gas may be injected back into the inlet of the calcining cyclone as a calcination medium. At least a portion of the preheated air may by injected into the preheating cyclone stage and any remainder of the preheated air may be vented.

The first recirculating system may comprise one or more of the following: a heater to provide a temperature up to 2000° C., at least one heat exchanger to quench the looped carbon dioxide ($CO_2$) gas down before pressurizing, a baghouse to remove small dust particles from the carbon dioxide ($CO_2$) gas, a blower and/or turbine to pressurize the looped carbon dioxide ($CO_2$) gas and inject the first gas back into the calcination zone, and/or a carbon dioxide ($CO_2$) gas vent/valve to vent the excess carbon dioxide ($CO_2$) gas from the system. The carbon dioxide ($CO_2$) gas may be up to 100% pure, such as consisting of carbon dioxide and incidental impurities.

The system may be free, substantially free, essentially free, or completely free of carbon dioxide emissions from combustion. The system may be free, substantially free, essentially free, or completely free of any $NO_x$, emissions and carbon dioxide ($CO_2$) emissions (except from limestone calcination) from combustion. As generally used herein, the phrase "free" refers to having 20 wt. % or less, "substantially free" refers to having 10 wt. % or less, "essentially free" means less than 5 wt. % and "completely free" means less than 1 wt. %. The heat source for the kiln may comprise electrical energy. Without wishing to be bound to any particular theory, the system may be free, substantially free, essentially free, or completely free of recarbonation of the lime when ambient air is used to cool the lime.

Without wishing to be bound to any particular theory, it is believed that the calciner may provide one or more of the following benefits: the calciner system may calcine smaller particles which may be advantage for a plant efficiency; the calciner system may require less energy and time to preheat and/or cool down the system; and the calciner system may have better heat transfer inside the equipment and better quality distribution because of particles reaction surface relative to conventional calciner systems.

The present invention may be generally directed to a method of making quicklime in a calciner comprising preheating a solid carbonate material in a preheating zone stage operating at a temperature less than a calcination temperature of the solid carbonate material, heating the preheated solid carbonate material in a calcination zone stage operating at at least the calcination temperature to generate a solid oxide material and carbon dioxide gas, cooling the solid oxide material in a cooling zone stage operating at a temperature less than the calcination temperature to cool the solid oxide material to ambient temperature, extracting a first gas from the preheating zone stage and a second gas from the cooling zone stage, and recirculating the first gas to the calcination zone stage and the second gas to the preheating zone stage.

The present invention may be generally directed to a system for recovering heat and/or carbon dioxide from a calciner for making quicklime may generally comprise a preheating zone for receiving a solid carbonate material and operating at a temperature less than a calcination temperature of the solid carbonate material, a calcination zone stage for heating the preheated solid carbonate material and operating at the calcination temperature in which the solid carbonate material is converted to solid oxide material and carbon dioxide gas, a cooling zone stage for cooling the solid oxide material and operating at a temperature in which the solid oxide material is cooled to ambient temperature, the system comprising: a first recirculating system to extract and recirculate a first gas from the outlet of the calcination zone stage; and a second recirculating system to extract and recirculate a second gas from the cooling zone stage to the preheating zone stage.

For example, the system for recovering heat and/or carbon dioxide from an indirect-fired, calciner for making quicklime may generally comprise a preheating zone for receiving a solid calcium carbonate material and operating at a temperature less than a calcination temperature of the solid calcium carbonate material, a calcination zone for heating the preheated solid calcium carbonate material and operating at the calcination temperature in which the solid calcium carbonate material is converted to solid calcium oxide material and carbon dioxide gas, a cooling zone for cooling the solid calcium oxide material and operating at a temperature in which the solid calcium oxide material is cooled to ambient temperature, the system comprising: a first recirculating system to extract and recirculate a first gas from the outlet of the calcination zone stage to the inlet of the calcination zone stage; and a second recirculating system to extract and recirculate a second gas from the cooling zone stage to the preheating zone stage.

The following aspects are described in this application:

Aspect 1. A method of making quicklime in an indirect-fired vertical kiln, the method comprising: preheating a solid carbonate material in a preheating zone operating at a temperature less than a calcination temperature of the solid carbonate material; heating the preheated solid carbonate material in a calcination zone operating at the calcination temperature to generate a solid oxide material and carbon dioxide gas; cooling the solid oxide material in a cooling zone operating at a temperature to cool the solid oxide material to ambient temperature; extracting a first gas from the preheating zone and a second gas from the cooling zone; and recirculating the first gas to the calcination zone and the second gas to the preheating zone.

Aspect 2. The method of aspect 1, wherein the indirect-fired vertical kiln comprises an electric kiln.

Aspect 3. The method of any of the foregoing aspects, wherein the solid carbonate material comprises at least one of calcium carbonate ($CaCO_3$) and dolomitic stone ($CaCO_3.MgCO_3$) and sodium carbonate ($Na_2CO_3$), potassium carbonate ($K_2CO_3$), ferrous carbonate ($FeCO_3$), manganese carbonate ($MnCO_3$), cobalt carbonate ($CoCO_3$), nickel carbonate ($NiCO_3$), cupric carbonate ($CuCO_3$), zinc carbonate ($ZnCO_3$), aluminum carbonate ($Al_2CO_3$).

Aspect 4. The method of any of the foregoing aspects, wherein the solid carbonate material comprises, based on weight percent of the solid carbonate material, calcium carbonate ($CaCO_3$) and a balance of incidental impurities, and a particle size from 0-120 mm.

Aspect 5. The method according to any of the foregoing aspects, wherein the solid carbonate material is preheated to a temperature from 0-900° C. in the preheating zone; wherein the solid carbonate material is heated to a temperature from 900-1050° C. in calcination zone; and wherein the solid carbonate material is cooled to a temperature from 50-150° C. in the cooling zone.

Aspect 6. The method according to any of the foregoing aspects, wherein the first gas has a temperature of 750-1100° C. when extracted from the calcining zone and a temperature of 900-2000° C. when inserted into the calcination zone; and wherein the second gas has a temperature of 750-1000° C. when extracted from the cooling zone and a temperature of 750-1000° C. when inserted into the preheating zone.

Aspect 7. The method according to any of the foregoing aspects, wherein the first and second gas are independently selected from the group consisting of carbon dioxide and incidental impurities.

Aspect 8. The method according to any of the foregoing aspects, wherein the first gas and second gas each consist of carbon dioxide and incidental impurities.

Aspect 9. The method according to any of the foregoing aspects comprising filtering, cooling, compressing, and heating the first gas prior to inserting the first gas into the calcination zone.

Aspect 10. The method according to any of the foregoing aspects comprising filtering and exhausting at least a portion of the first gas after extracting the first gas from the preheating zone.

Aspect 11. The method according to any of the foregoing aspects, wherein at least a portion of 3.0-3.5 GJ/ton of solid carbonate material for heating the preheated solid carbonate material in the calcination zone is provided by the first gas.

Aspect 12. The method according to any of the foregoing aspects, wherein the first gas provides at least 90-100% of the 3.0-3.5 GJ/ton of solid carbonate material for heating the preheated solid carbonate material in the calcination zone.

Aspect 13. The method according to any of the foregoing aspects, wherein at least a portion of 0.7-1.2 GJ/ton of solid carbonate material for preheating the solid carbonate material in the preheating zone is provided by the second gas.

Aspect 14. The method according to any of the foregoing aspects, wherein the second gas provides at least 40-100% of the 0.7-1.2 GJ/ton for preheating a solid carbonate material in the preheating zone.

Aspect 15. The method according to any of the foregoing aspects comprising generating a hot flue gas stream to contact at least one of the solid carbonate material and preheated solid carbonate material, wherein the hot flue gas stream comprises, based on total volume of the hot flue gas stream, at least 99-100% of first gas and second gas.

Aspect 16. The method according to any of the foregoing aspects comprising generating a hot flue gas stream to contact at least one of the solid carbonate material and preheated solid carbonate material, wherein the hot flue gas stream comprises a ratio of the first gas to the second gas of 40/1.

Aspect 17. A system for making quicklime, the system comprising: an indirect-fired kiln comprising a preheating zone for receiving a solid carbonate ($CaCO_3$) material and operating at a temperature less than a calcination temperature of the solid calcium carbonate material ($CaCO_3$), a calcination zone for heating the preheated solid calcium carbonate material and operating at the calcination temperature in which the solid calcium carbonate material ($CaCO_3$) is converted to solid calcium oxide (CaO) and carbon dioxide gas ($CO_2$), a cooling zone for cooling the solid calcium oxide (CaO) and operating at a temperature in which the solid calcium oxide (CaO) is cooled to ambient temperature; a first recirculating system to extract and recirculate a first gas from the preheating zone to the calcination zone; and a second recirculating system to extract and recirculate a second gas from the cooling zone to the preheating zone.

Aspect 18. The system of any of the foregoing aspects, wherein the first recirculating system comprises an electric heater to heat the calcination zone using at least a portion of the first gas to achieve the calcination temperature.

Aspect 19. The system of any of the foregoing aspects, wherein an energy requirement of the calcination heater to heat the calcination zone relative to a temperature of the first gas to achieve the calcination temperature is reduced by at least 30-50% relative to a system lacking the first recirculating system and the second recirculating system.

Aspect 20. A system for recovery of heat and carbon dioxide from an indirect-fired vertical kiln for making quicklime, the system comprising a preheating zone for receiving a solid calcium carbonate ($CaCO_3$) material and operating at a temperature less than a calcination temperature of the solid calcium carbonate material ($CaCO_3$), a calcination zone for heating the preheated solid calcium carbonate material and operating at the calcination temperature in which the solid calcium carbonate material ($CaCO_3$) is converted to solid calcium oxide (CaO) and carbon dioxide gas ($CO_2$), a cooling zone for cooling the solid calcium oxide (CaO) and operating at a temperature in which the solid calcium oxide (CaO) is cooled to ambient temperature, the system comprising: a first recirculating system to extract and recirculate a first gas from the preheating zone to the calcination zone; and a second recirculating system to extract and recirculate a second gas from the cooling zone to the preheating zone.

Aspect 21. A method of making quicklime comprising: preheating a solid carbonate material in a preheating cyclone stage operating at a temperature less than a calcination temperature of the solid carbonate material; heating the preheated solid carbonate material in a calcination cyclone stage operating at the calcination temperature to generate a solid oxide material and carbon dioxide gas; cooling the solid oxide material in a cooling cyclone stage operating at a temperature to cool the solid oxide material to ambient temperature; extracting a first gas from an outlet of the calcination cyclone stage and a second gas from the cooling cyclone stage; and recirculating the first gas to an inlet of the calcination cyclone stage and the second gas to the preheating cyclone stage.

Aspect 22. The method of any of the foregoing aspects, wherein the indirect-fired vertical kiln comprises an electric kiln.

Aspect 23. The method of any of the foregoing aspects, wherein the solid carbonate material comprises at least one of calcium carbonate ($CaCO_3$) and dolomitic stone ($CaCO_3.MgCO_3$) and sodium carbonate ($Na_2CO_3$), potassium carbonate ($K_2CO_3$), ferrous carbonate ($FeCO_3$), manganese carbonate ($MnCO_3$), cobalt carbonate ($CoCO_3$), nickel carbonate ($NiCO_3$), cupric carbonate ($CuCO_3$), zinc carbonate ($ZnCO_3$), aluminum carbonate ($Al_2CO_3$).

Aspect 24. The method according to any of the foregoing aspects, wherein the solid carbonate material comprises, based on weight percent of the solid carbonate material, calcium carbonate ($CaCO_3$) and a balance of incidental impurities, and a particle size from 0.01-4 mm.

Aspect 25. The method according to any of the foregoing aspects, wherein the solid carbonate material is preheated to a temperature from 0-900° C. in the preheating cyclone stage; wherein the solid carbonate material is heated to a temperature from 700-1050° C. in calcination cyclone stage; and wherein the solid carbonate material is cooled to a temperature from 20-300° C. in the cooling cyclone stage.

Aspect 26. The method according to any of the foregoing aspects, wherein the first gas has a temperature of 700-1100° C. when extracted from the outlet of the calcination cyclone stage and a temperature of 900-2000° C. when inserted into the inlet of the calcination cyclone stage; and wherein the second gas has a temperature of 500-1000° C. when extracted from the cooling cyclone stage and a temperature of 500-1000° C. when inserted into the preheating cyclone stage.

Aspect 27. The method according to any of the foregoing aspects, wherein the first and second gas are independently selected from the group consisting of carbon dioxide and incidental impurities and steam.

Aspect 28. The method according to any of the foregoing aspects, wherein the first gas and second gas each consist of carbon dioxide and incidental impurities and steam.

Aspect 29. The method according to any of aspects 1-8 comprising filtering, cooling, compressing, and heating the first gas prior to inserting the first gas into the inlet of the calcination cyclone stage.

Aspect 30. The method according to any of the foregoing aspects comprising filtering and exhausting at least a portion of the first gas after extracting the first gas from the preheating cyclone stage.

Aspect 31. The method according to any of the foregoing aspects, wherein at least a portion of 3.20-4.50 GJ/ton of solid carbonate material for heating the preheated solid carbonate material in the calcination cyclone stage zone is provided by the first gas.

Aspect 32. The method according to any of the foregoing aspects, wherein the first gas provides at least 60-100% of the 3.2-4.50 GJ/ton of solid carbonate material for heating the preheated solid carbonate material in the calcination zone.

Aspect 33. The method according to any of the foregoing aspects, wherein at least a portion of 0.4-1.2 GJ/ton of solid carbonate material for preheating the solid carbonate material in the preheating cyclone stage is provided by the second gas.

Aspect 34. The method according to any of the foregoing aspects, wherein the second gas provides at least 10-50% of the 0.4-1.2 GJ/ton for preheating a solid carbonate material in the preheating cyclone stage.

Aspect 35. The method according to any of the foregoing aspects comprising generating a hot flue gas stream to contact at least one of the solid carbonate material and preheated solid carbonate material, wherein the hot flue gas stream comprises, based on total volume of the hot flue gas stream, at least 99-100% of first gas and second gas.

Aspect 36. The method according to any of the foregoing aspects comprising generating a hot flue gas stream to contact at least one of the solid carbonate material and preheated solid carbonate material, wherein the hot flue gas stream comprises a ratio of the first gas to the second gas of 40:1.

Aspect 37. A system for making quicklime, the system comprising: an indirect-fired kiln comprising, a preheating cyclone stage for receiving a solid carbonate ($CaCO_3$) material and operating at a temperature less than a calcination temperature of the solid calcium carbonate material ($CaCO_3$), a calcination cyclone stage for heating the preheated solid calcium carbonate material and operating at the calcination temperature in which the solid calcium carbonate material ($CaCO_3$) is converted to solid calcium oxide (CaO) and carbon dioxide gas ($CO_2$), a cooling cyclone stage for cooling the solid calcium oxide (CaO) and operating at a temperature in which the solid calcium oxide (CaO) is cooled to ambient temperature; a first recirculating system to extract and recirculate a first gas from an outlet of the calcination cyclone stage to the an inlet of the calcination cyclone stage; and a second recirculating system to extract and recirculate a second gas from the cooling cyclone stage to the preheating cyclone stage.

Aspect 38. The system of any of the foregoing aspects, wherein the first recirculating system comprises an electric heater to heat the calcination cyclone stage using at least a portion of the first gas to achieve the calcination temperature.

Aspect 39. The system of any of the foregoing aspects, wherein an energy requirement of the calcination heater to heat the calcination cyclone stage relative to a temperature of the first gas to achieve the calcination temperature is reduced by at least 30-50% relative to a system lacking the first recirculating system and the second recirculating system.

Aspect 40. A system for recovery of heat and carbon dioxide from a kiln for making quicklime comprising a preheating cyclone stage for receiving a solid calcium carbonate ($CaCO_3$) material and operating at a temperature less than a calcination temperature of the solid calcium carbonate material ($CaCO_3$), a calcination cyclone stage for heating the preheated solid calcium carbonate material and operating at the calcination temperature in which the solid calcium carbonate material ($CaCO_3$) is converted to solid calcium oxide (CaO) and carbon dioxide gas ($CO_2$), a cooling cyclone stage for cooling the solid calcium oxide (CaO) and operating at a temperature in which the solid calcium oxide (CaO) is cooled to ambient temperature, the system comprising: a first recirculating system to extract and recirculate a first gas from an outlet of the calcination cyclone stage to an inlet of the calcination zone; and a second recirculating system to extract and recirculate a second gas from the cooling cyclone stage to the preheating cyclone stage.

All documents cited herein are incorporated herein by reference, but only to the extent that the incorporated material does not conflict with existing definitions, statements, or other documents set forth herein. To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to this application.

While particular embodiments have been illustrated and described, it would be obvious to those skilled in the art that various other changes and modifications may be made without departing from the spirit and scope of the invention. Those skilled in the art will recognize, or be able to ascertain using no more than routine experimentation, numerous equivalents to the specific apparatuses and methods described herein, including alternatives, variants, additions, deletions, modifications and substitutions. This application including the appended claims is therefore intended to cover all such changes and modifications that are within the scope of this application.

What is claimed is:

1. A method of making quicklime in a calciner, the method comprising:
   preheating a solid carbonate material in a preheating cyclone stage operating at a temperature less than a calcination temperature of the solid carbonate material;
   heating the preheated solid carbonate material in a calcination cyclone stage operating at a temperature of at least the calcination temperature to generate a solid oxide material and carbon dioxide gas;
   cooling the solid oxide material in a cooling cyclone stage operating at a temperature to cool the solid oxide material to ambient temperature;
   extracting a first gas from an outlet of the calcination cyclone stage and a second gas from the cooling cyclone stage;
   recirculating the first gas to an inlet of the calcination cyclone stage and the second gas to the preheating cyclone stage; and
   filtering, cooling, compressing, and heating the first gas prior to inserting the first gas into the inlet of the calcination cyclone stage.

2. The method of claim 1, wherein the calciner comprises an indirect-fired vertical kiln comprising an electric kiln.

3. The method of claim 1 wherein the solid carbonate material comprises at least one of calcium carbonate ($CaCO_3$), dolomitic stone ($CaCO_3.MgCO_3$), sodium carbonate ($Na_2CO_3$), potassium carbonate ($K_2CO_3$), ferrous carbonate ($FeCO_3$), manganese carbonate ($MnCO_3$), cobalt carbonate ($CoCO_3$), nickel carbonate ($NiCO_3$), cupric carbonate ($CuCO_3$), zinc carbonate ($ZnCO_3$), and aluminum carbonate ($Al_2CO_3$).

4. The method of claim 1, wherein the solid carbonate material comprises, calcium carbonate ($CaCO_3$) and a balance of incidental impurities, and a particle size from 0.01-10 mm.

5. The method of claim 1,
   wherein the solid carbonate material is preheated to a temperature from 0-900° C. in the preheating cyclone stage;
   wherein the solid carbonate material is heated to a temperature from 700-1000° C. in calcination cyclone stage; and
   wherein the solid carbonate material is cooled to a temperature from 20-300° C. in the cooling cyclone stage.

6. The method of claim 1
   wherein the first gas has a temperature of 700-1100° C. when extracted from the outlet of the calcination cyclone stage and a temperature of 900-2000° C. when inserted into the inlet of the calcination cyclone stage; and
   wherein the second gas has a temperature of 500-1000° C. when extracted from the cooling cyclone stage and a temperature of 500-1000° C. when inserted into the preheating cyclone stage.

7. The method of claim 1 comprising cooling the second gas prior to inserting the second gas into the preheating cyclone stage.

8. The method of claim 1 comprising inserting the first gas into the preheating cyclone stage and filtering and exhausting at least a portion of the first gas after extracting the first gas from the preheating cyclone stage.

9. The method of claim 1 comprising contacting the recirculated first gas and second gas in a calcination cyclone stage to generate a hot flue gas stream to contact the preheated solid carbonate material in a calcination cyclone stage.

10. The method of claim 1, wherein the first gas and second gas comprise a hot flue gas stream to contact the preheated solid carbonate material in a calcination cyclone stage, wherein the hot flue gas stream comprises a ratio of the first gas to the second gas, based on total volume of the hot flue gas stream, from 1:1 to 50:1.

11. The method of claim 1, wherein the first gas and second gas comprise a hot flue gas stream to contact the preheated solid carbonate material in a calcination cyclone stage, wherein the hot flue gas stream comprises a ratio of the first gas to the second gas, based on total volume of the hot flue gas stream, selected from the group consisting of 1:1, 2:1, 5:1, 10:1, 20:1, 25:1, 30:1, 35:1, 40:1, 45:1, and 50:1.

12. The method of claim 1, wherein the first gas and second gas are independently selected from the group consisting of air, steam, carbon dioxide, nitrogen, oxygen, and combinations thereof.

13. The method of claim 1, wherein the first gas comprises carbon dioxide and steam, and the second gas comprises carbon dioxide and steam.

14. The method of claim 1, wherein the solid carbonate material comprises a particle size from 10-100 mm.

15. The method of claim 1, wherein the solid carbonate material comprises a particle size from 1-20 mm.

16. The method of claim 1, wherein the solid carbonate material is preheated to a temperature from 500-900° C. in the preheating cyclone stage.

17. The method of claim 1, wherein the solid carbonate material is preheated to a temperature from 700-900° C. in the preheating cyclone stage.

18. The method of claim 1, wherein the solid carbonate material is heated to a temperature from 700-1050° C. in calcination cyclone stage.

19. The method of claim 1, wherein the solid carbonate material is heated to a temperature from 700-950° C. in calcination cyclone stage.

20. The method of claim 1, wherein the solid carbonate material is heated to a temperature from 900-1050° C. in calcination cyclone stage.

* * * * *